(12) United States Patent
Li

(10) Patent No.: US 7,587,982 B2
(45) Date of Patent: Sep. 15, 2009

(54) MAGNETIC LEVITATION GUIDEWAY-TRAIN SYSTEM

(76) Inventor: Lingqun Li, $2^{nd}$ Floor, Tower A, Bldg., No. 14, Chuangye Yuan, Shuang D Gang, Gaoxinyuanqu, No. 12 Liaohedonglu, Dalian, 116620 (CN)

( * ) Notice: Subject to any disclaimer, the term of this patent is extended or adjusted under 35 U.S.C. 154(b) by 227 days.

(21) Appl. No.: 11/590,572

(22) Filed: Oct. 31, 2006

(65) Prior Publication Data

US 2007/0095245 A1      May 3, 2007

(30) Foreign Application Priority Data

Nov. 1, 2005      (CN) .................. 2005 1 0117177

(51) Int. Cl.
    *B60L 13/04*      (2006.01)
    *B60L 13/06*      (2006.01)
(52) U.S. Cl. ..................... 104/281; 104/284
(58) Field of Classification Search ............ 104/123, 104/124, 281–286
    See application file for complete search history.

(56) References Cited

U.S. PATENT DOCUMENTS

| 3,885,504 | A | * | 5/1975 | Baermann | 104/283 |
|---|---|---|---|---|---|
| 3,904,899 | A | * | 9/1975 | Malfert | 104/290 |
| 3,937,148 | A | * | 2/1976 | Simpson | 104/283 |
| 5,317,976 | A | * | 6/1994 | Aruga et al. | 104/282 |
| 5,454,328 | A | * | 10/1995 | Matsuzaki et al. | 104/139 |
| 5,511,488 | A | * | 4/1996 | Powell et al. | 104/282 |
| 5,601,027 | A | * | 2/1997 | Shinozaki et al. | 104/249 |
| 5,605,100 | A | * | 2/1997 | Morris et al. | 104/284 |
| 5,628,252 | A | * | 5/1997 | Kuznetsov | 104/284 |
| 5,649,489 | A | * | 7/1997 | Powell et al. | 104/282 |
| 5,666,883 | A | * | 9/1997 | Kuznetsov | 104/281 |
| 5,934,198 | A | * | 8/1999 | Fraser | 105/144 |
| 6,178,892 | B1 | * | 1/2001 | Harding | 104/155 |
| 6,357,359 | B1 | * | 3/2002 | Davey et al. | 104/282 |
| 6,361,268 | B1 | * | 3/2002 | Pelrine et al. | 414/749.2 |
| 6,450,103 | B2 | * | 9/2002 | Svensson | 104/120 |
| 6,510,799 | B2 |   | 1/2003 | Lamb et al. | |
| 6,827,022 | B2 | * | 12/2004 | van den Bergh et al. | 104/284 |
| 6,899,036 | B2 | * | 5/2005 | Lamb et al. | 104/290 |
| 6,925,941 | B2 | * | 8/2005 | Bengoa Saez De Cortazar | 104/123 |

(Continued)

FOREIGN PATENT DOCUMENTS

CN      1557650 A      1/2004

OTHER PUBLICATIONS

Wei, Qingchao and Kong, Younjian: "Magnetic Levitation Railway System and Technique", p. 19, para. 4, Ch. 1, *China Science and Technology Publ. Co.*, Nov. 2003.

*Primary Examiner*—S. Joseph Morano
*Assistant Examiner*—Jason C Smith
(74) *Attorney, Agent, or Firm*—Hunton & Williams LLP

(57) ABSTRACT

A magnetic levitation guideway-train system is provided. The levitation power chambers located at a lower portion of the train are fitted in the grooved guideway, and the side permanent magnets of the levitation power chambers and the ferromagnetic balance levitation tracks correspond to one another so as to generate upward or downward balance attractive force for the train. Wing permanent magnets at the bottom of the levitation power chamber and the permanent magnet tracks correspond to one another so that the identical poles of the wing permanent magnets and the permanent magnet tracks repel one another to provide the train with an upward repulsion levitation force.

15 Claims, 3 Drawing Sheets

U.S. PATENT DOCUMENTS

| | | | |
|---|---|---|---|
| 6,983,701 B2* | 1/2006 | Thornton et al. | 104/282 |
| 7,134,396 B2* | 11/2006 | Ramu | 105/49 |
| 7,204,192 B2* | 4/2007 | Lamb et al. | 104/282 |
| 7,243,604 B2* | 7/2007 | Li | 104/139 |
| 7,314,008 B2* | 1/2008 | Li | 104/281 |
| 2003/0205163 A1* | 11/2003 | Lamb et al. | 104/282 |
| 2004/0119358 A1* | 6/2004 | Thornton et al. | 310/180 |
| 2004/0182275 A1* | 9/2004 | Frank et al. | 104/286 |
| 2005/0252407 A1* | 11/2005 | Li | 104/139 |
| 2006/0219128 A1* | 10/2006 | Li | 104/284 |
| 2006/0243157 A1* | 11/2006 | Li | 104/281 |
| 2007/0089636 A1* | 4/2007 | Guardo, Jr. | 104/281 |
| 2007/0095245 A1* | 5/2007 | Li | 104/284 |

\* cited by examiner

MAGNETIC LEVITATION GUIDEWAY-TRAIN SYSTEM

BACKGROUND OF THE INVENTION

1. Field of the Invention

The present application relates to a magnetic levitation train, and particularly to a permanent-magnet magnetic levitation guideway-train system.

2. Description of the Related Art

A TR magnetic levitation train is a representative of gas-gap sensing type electromagnetic levitation trains. A MLX magnetic levitation train is a representative of superconducting magnet type electrodynamic magnetic levitation trains. A Chinese hanging guideway type magnetic levitation train and a hidden guideway type magnetic levitation train are a representative of a permanent-magnet magnetic levitation train.

The TR and MLX magnetic levitation trains has a disadvantage of high cost of more than two hundred and eight million yuan per kilometer, low suspension capacity of 0.8 tons per meter, restrictive application to passenger transportation, and high energy cost.

The Chinese hanging guideway type magnetic levitation train is disadvantageous in that when it runs at a high speed, noise is concentrated on the ground, which adversely affects the environment, and in that it is inconvenient to maintain and examine the guideway. In addition, the hidden guideway type magnetic levitation train has a drawback that it has a low speed, and is inconvenient in maintenance and examination of the guideway, too.

Reference can be made to Magnetic Levitation Train System, published by China Science and Technology Publisher on November, 2003, Chinese Patent No ZL00105737.5, and Chinese Patent No. ZL200410002291.4, in order to know the detailed contents about the above prior art.

SUMMARY OF THE INVENTION

It is an object of the present invention to provide a magnetic levitation guideway-train system.

According to one aspect of the present application, there is provided a magnetic levitation guideway-train system, comprising: a vehicle including a vehicle body; a grooved guideway defining a groove therein; first and second pairs of ferromagnetic balance levitation tracks extending in a longitudinal direction of the grooved guideway, the first pair of ferromagnetic balance levitation tracks being disposed parallel to each other with a predetermined interval therebetween on a first side of two sides of the groove of the grooved guideway, and the second pair of ferromagnetic balance levitation tracks being disposed parallel to each other with a predetermined interval therebetween on a second side of the two sides of the groove of the grooved guideway; and first and second pairs of side permanent magnets extending in a longitudinal direction of the vehicle body, the first pair of side permanent magnets being disposed corresponding to the first pair of ferromagnetic balance levitation tracks on a first side of two sides of the vehicle body and one of the first pair of side permanent magnets being set to be S. pole and other one of the first pair of side permanent magnets being set to be N. pole, and the second pair of side permanent magnets being disposed corresponding to the second pair of ferromagnetic balance levitation tracks on a second side of the two sides of the vehicle body and one of the second pair of side permanent magnets being set to be S. pole and other one of the second pair of side permanent magnets being set to be N. pole.

In order to achieve the object of the present invention, the present invention provides a magnetic levitation guideway-train system comprising a grooved guideway, and a vehicle, wherein the grooved guideway is fixed on piers; first and second guide tracks each formed by arranging ferromagnetic stator shoes at an equal interval are fixed on two inner sides of the grooved guideway, respectively; a first pair of ferromagnetic balance levitation tracks are fixed parallel to each other on upper and lower portions of the first guide track, respectively; a second pair of ferromagnetic balance levitation tracks are fixed parallel to each other on upper and lower portions of the second guide track, respectively; and two permanent magnet tracks are disposed on two sides of a bottom of the grooved guideway, respectively.

The vehicle includes levitation power chambers and cars, wherein the levitation power chambers are located within the grooved guideway, there is an operating air gas of 30-200 mm between an outer bottom surface of the levitation power chamber and the grooved guideway; upper and lower side permanent magnets are fixed, corresponding to the perspective first and second pairs of ferromagnetic balance levitation tracks on the first and second guide tracks, on each of two sides of the levitation power chamber body, there is an operating air gap of 3-40 mm between the ferromagnetic balance levitation tracks and the corresponding side permanent magnets, one of the upper and lower side permanent magnets on each of the two sides of the levitation power chamber body is set to be S. pole, and other one of the upper and lower side permanent magnets on each of the two sides of the levitation power chamber body is set to be N. pole, so that when the side permanent magnets and the corresponding ferromagnetic balance levitation tracks have the same level, an attractive force in a vertical direction between the side permanent magnets and the corresponding ferromagnetic balance levitation tracks is 0; when the side permanent magnets are lower than the corresponding ferromagnetic balance levitation tracks, an upward levitation force is generated between them; and when the side permanent magnets are higher than the corresponding ferromagnetic balance levitation tracks, a downward pulling force is generated between them; rotator wheels of magnetic motors are disposed between the upper and lower side permanent magnets on each side of the two sides of the levitation power chambers and are arranged horizontally at a predetermined interval in a longitudinal direction of the vehicle; guide wheels for keeping the vehicle at a center between the first and second guide tracks disposed on the grooved guideway are also disposed between the upper and lower side permanent magnets on each side of the two sides of the levitation power chambers and are arranged horizontally at a predetermined interval in the longitudinal direction of the vehicle, an air gap of 3-50 mm is kept between the rotator wheels and the corresponding guide tracks so as to generate a tractive force or a braking force therebetween; two wing permanent magnets are provided on two sides of a bottom of each of the levitation power chambers, respectively, identical poles of the two wing permanent magnets and the two permanent magnet tracks disposed on the two sides of the bottom of the grooved guideway face each other with an air gap of 3-60 mm therebetween, respectively, so as to generate a repulsion levitation force therebetween.

Each of the cars has a chassis to and under which each of the levitation power chambers is connected through a shaft, and each car has at least two levitation power chambers under the car; circular upper permanent magnets are disposed on a lower surface of the chassis of each of the cars, a circular lower permanent magnet is disposed on an upper surface of each of the levitation power chambers, and the upper permanent magnets and the corresponding lower permanent magnets are arranged coaxially, with identical poles of the upper permanent magnets and the corresponding lower permanent magnets facing each other, respectively, so that each of the cars is levitated above the levitation power chambers and the levitation power chambers are rotatable about the respective shafts with respect to the car.

The grooved guideway comprises at least two grooved guideways, and a temperature joint is disposed between adjacent grooved guideways of the at least two grooved guideways.

Upper shaft sleeves are fixed to the chassis of each of the car, and a lower shaft sleeve is fixed to an upper portion of each of the levitation chambers, wherein the shafts are fitted in the upper and lower shaft sleeves.

Each of the rotator wheels of magnetic motors is connected to an electric motor through a gear train.

The permanent magnets are made of NdFeB.

A layer of aluminium alloy is formed on a surface of each of the ferromagnetic stator shoes.

The permanent-magnet magnetic levitation guideway-train system of the present invention is advantageous in that it is convenient to maintain and examine the magnetic levitation guideway with high efficiency, the system is manufactured at a low cost, and when the train runs, noise is low on the ground, which is environment friendly.

DETAILED DESCRIPTION OF THE EMBODIMENTS

The embodiments are described below in order to explain the present invention by referring to the figures. However, it is to be understood that the invention is not limited to the embodiments.

Figure 1:
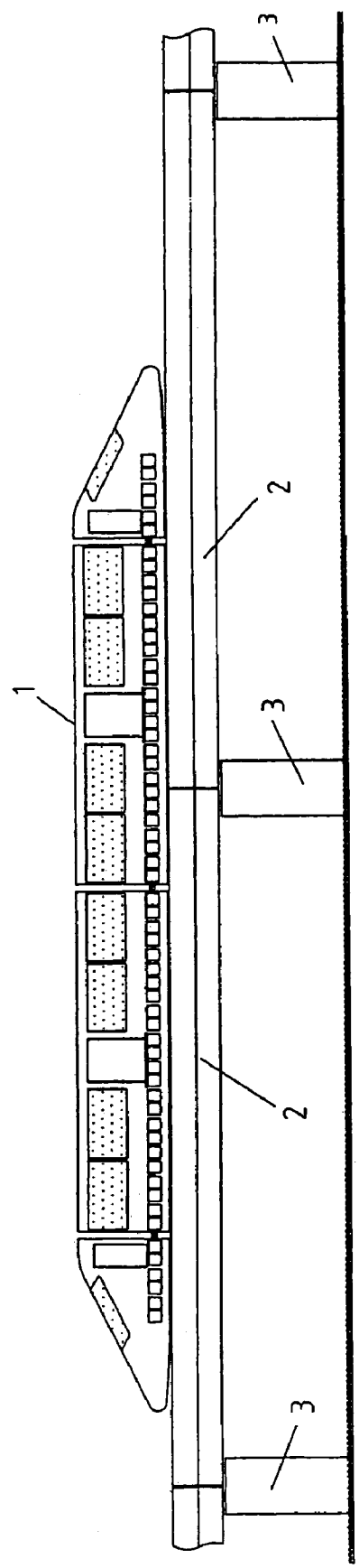
FIG. 1 is schematic side view showing a permanent-magnet magnetic levitation guideway-train system of the present application.
Figure 2:
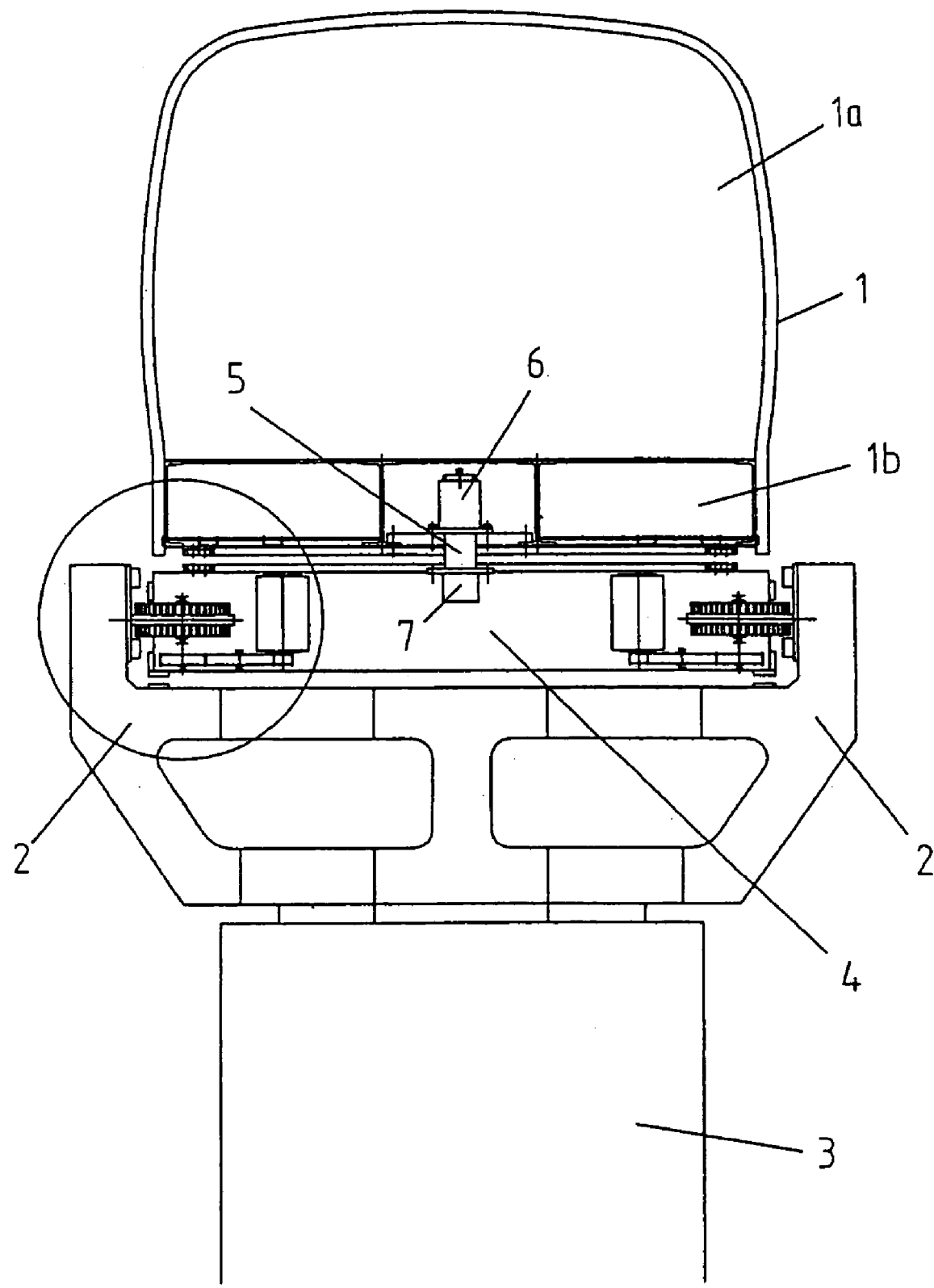
FIG. 2 is a schematic sectional view showing the permanent-magnet magnetic levitation guideway-train system of the present application.

Referring to FIGS. 1 and 2, a magnetic levitation guideway-train system according to the present application comprises a grooved guideway and a vehicle. A permanent magnet levitation train 1 as an example of the vehicle is located in the grooved guideway 2. The train 1 runs above the grooved guideway fixed to piers 3. The grooved guideway 2 comprises at least two grooved guideways, and a temperature expansion joint is disposed between adjacent grooved guideways of the at least two grooved guideways. A guide track 10 is fixed on each of two inner side surfaces of the grooved guideway, and is formed by arranging ferromagnetic stator shoes at an equal interval in a longitudinal direction of the grooved guideway 2. The ferromagnetic stator shoes are embedded in each of the two inner side surfaces of the grooved guideway with exposed surfaces of the embedded ferromagnetic stator shoes being flushed with the corresponding inner side surfaces. The exposed surfaces of the embedded ferromagnetic stator shoes and the corresponding inner side surfaces form guide surfaces of the guide tracks 10. A layer of hard aluminium alloy is formed on a surface of each of the ferromagnetic stator shoes, or on each of the guide surfaces to be used as guide track surfaces. A first pair of ferromagnetic balance levitation tracks 12 are fixed parallel to each other on upper and lower portions of one of the guide tracks 10, respectively; and a second pair of ferromagnetic balance levitation tracks 12 are fixed parallel to each other on upper and lower portions of the other one of the guide tracks 10, respectively. A permanent magnetic track 15 is disposed at each side of two sides of a bottom of the grooved guideway 2.

Alternatively, a first pair of ferromagnetic balance levitation tracks 12 parallel to each other with a predetermined interval therebetween may be disposed directly on one of the two inner side surfaces of the grooved guideway 2, and a second pair of ferromagnetic balance levitation tracks 12 parallel to each other with a predetermined interval therebetween may be disposed directly on the other one of the two inner side surfaces of the grooved guideway 2.

Levitation chambers 4 are fitted in the grooved guideway 2 with an air gap of 30-200 mm between the levitation chambers 4 and a bottom surface of the grooved guideway 2.

Figure 3:
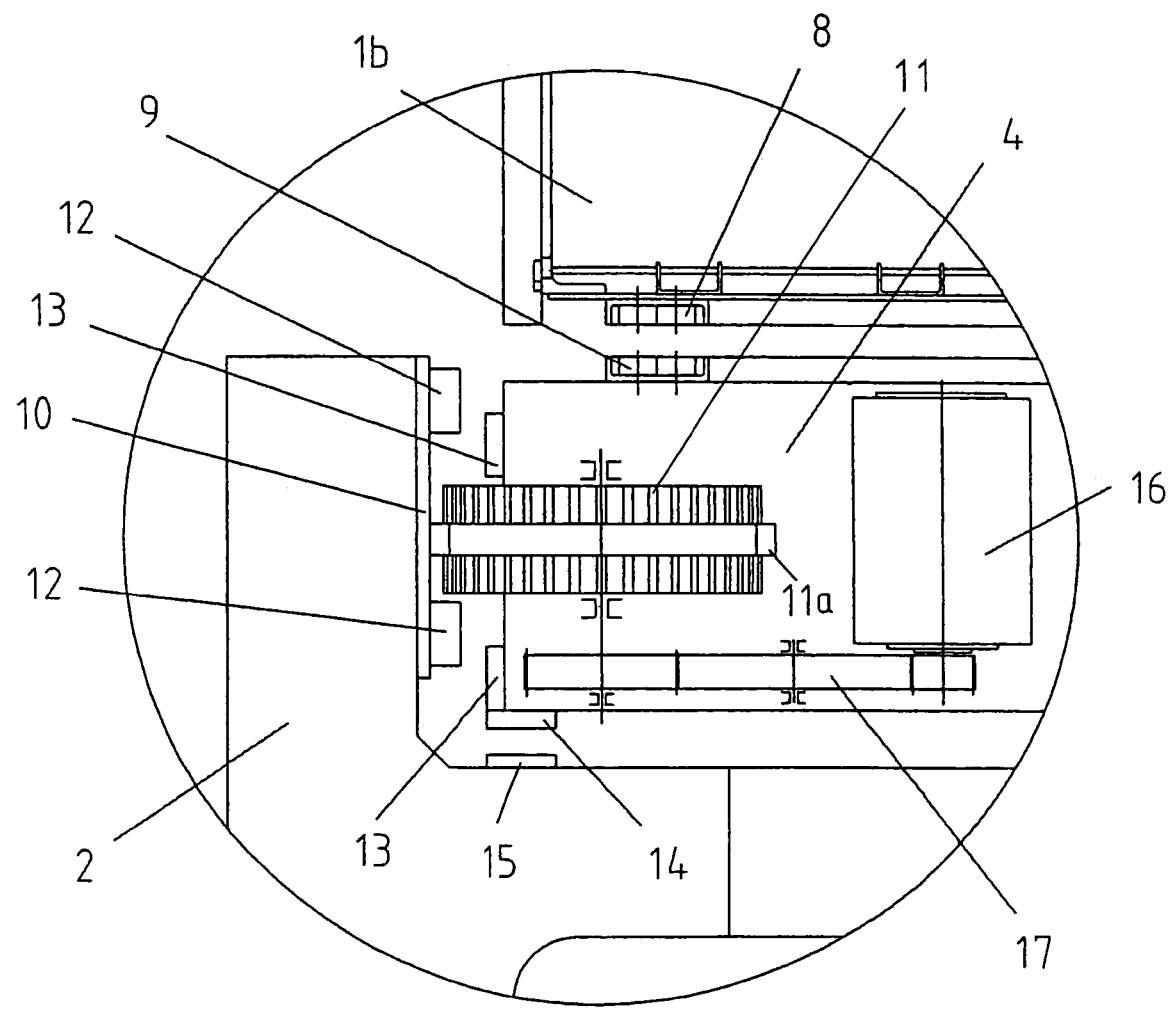
FIG. 3 is a schematic partly-enlarged view of a portion in a circle of FIG. 2.

Referring to FIG. 3, FIG. 3 is a schematic partly enlarged view of a portion in a circle of FIG. 2. An upper shaft sleeve 6 is disposed in a middle portion of a car chassis 1b, and a lower shaft sleeve 7 is arranged in a center of the levitation power chamber 4, so that the car chassis and the levitation power chamber are connected to each other by a shaft 5. Circular upper permanent magnets 8 are disposed on a lower surface of the car chassis 1b, and a circular lower permanent magnet 9 is disposed on an upper surface of each of the levitation power chambers 4, with identical poles of the upper permanent magnets and the corresponding lower permanent magnets facing each other with a preferable air gap of 10-150 mm, respectively, so that the car is levitated, thereby constituting a magnetic levitation bogie.

A first pair of upper and lower side permanent magnets 13 are fixed, corresponding to the first pair of ferromagnetic balance levitation tracks 12, on one of two sides of the levitation power chamber 4, and a second pair of upper and lower side permanent magnets 13 are fixed, corresponding to the second pair of ferromagnetic balance levitation tracks 12, on the other one of the two sides of the levitation power chamber 4. One of the upper and lower side permanent magnets of each pair of the first and second pairs of upper and lower side permanent magnets 13 is set to be S. pole, and the other one of the upper and lower side permanent magnets is set to be N. pole. An optimal air gap between the ferromagnetic balance levitation tracks 12 and the corresponding side permanent magnets 13 of the levitation power chamber 4 is 3-40 mm. In use, when the side permanent magnets 13 and the corresponding ferromagnetic balance levitation tracks 12 have the same level, an attractive force in a vertical direction between the side permanent magnets 13 and the corresponding ferromagnetic balance levitation tracks is 0; when the side permanent magnets 13 are lower than the corresponding ferromagnetic balance levitation tracks 12, an upward levitation force is generated between them; and when the side permanent magnets 13 are higher than the corresponding ferromagnetic balance levitation tracks 12, a downward pulling force is generated between them. This balance levitation technique not only can maintain a levitation state of the train so that the levitation state is not easily degraded due to change in height of the guideway during running of the train, but also can assure that the train does not go off the guideway due to change in height of the guideway during running of the train.

The ferromagnetic balance levitation tracks 12 and the side permanent magnets 13 extend in the longitudinal direction of the grooved guideway 2 and a longitudinal direction of the vehicle, respectively. In one embodiment, an interval between the first pair of ferromagnetic balance levitation tracks 12, an interval between the first pair of side permanent magnets 13, an interval between the second pair of ferromagnetic balance levitation tracks 12, and an interval between the second pair of side permanent magnets 13 are equal to one another.

Rotator wheels 11 of magnetic motors and guide wheels 11a are disposed between the upper and lower side permanent magnets 13 of the levitation power chamber 4. The rotator wheels 11 of the magnetic motors are arranged horizontally at a predetermined interval in the longitudinal direction of the vehicle, and the guide wheels 11a are arranged horizontally at a predetermined interval in the longitudinal direction of the vehicle. The rotator wheels 11 of the magnetic motors and the guide wheels 11a are provided in such a manner that the rotator wheels 11 of the magnetic motors and the guide wheels 11a correspond to the respective guide tracks 10 respectively disposed on the two inner side surfaces of the grooved guideway 2. The guide wheels 11a are used for regulating the vehicle so that the vehicle is kept at a center between the two guide tracks 10. The rotator wheels 11 of the magnetic motors and the guide wheels 11a may be formed separately, or integrally as shown in FIGS. 1-3. Each of the rotator wheels 11 of the magnetic motors is driven by one of electric motors 16 through a gear train 17. When the rotator wheels 11 of the magnetic motors are driven by the electric motors 16, a tractive force are generated between the rotator wheels 11 of the magnetic motors and the corresponding guide tracks 10 to drive or brake the train. Moreover, an optimal air gap between the rotator wheels 11 of the magnetic motors and the corresponding guide tracks 10 is 3-50 mm.

In the embodiment shown in FIGS. 1-3, a pair of rotator wheels 11 of the magnetic motors as one set are coaxially disposed, and a plurality of such pairs of rotator wheels 11 of the magnetic motors are disposed between the upper and lower side permanent magnets 13 of the levitation power chamber 4 in the longitudinal direction of the vehicle. However, alternatively, one rotator wheel 11 of the magnetic motor may be set as one set, and a plurality of rotator wheels 11 of the magnetic motors are disposed between the upper and lower side permanent magnets 13 of the levitation power chamber 4 in the longitudinal direction of the vehicle.

Two wing permanent magnets 14 are provided, corresponding to the two permanent magnet tracks 15 disposed on the bottom of the grooved guideway, on two sides of a bottom of the levitation power chamber 4, respectively, and identical poles of the two wing permanent magnets and the two permanent magnet tracks face each other with an optimal air gap of 3-60 mm therebetween, respectively, so as to generate an upward levitation force for the train.

The permanent magnets used in the present invention may be made of NdFeB, but the present invention are not limited thereto.

According to an embodiment, there is provided a vehicle for a magnetic levitation guideway, comprising: levitation power chambers; a car located above the power chambers; first and second pairs of side permanent magnets extending in a longitudinal direction of the vehicle, the first pair of side permanent magnets being disposed on a first side of two sides of the levitation power chambers and one of the first pair of side permanent magnets being set to be S. pole and other one of the first pair of side permanent magnets being set to be N. pole, and the second pair of side permanent magnets being disposed on a second side of the two sides of the levitation power chambers and one of the second pair of side permanent magnets being set to be S. pole and other one of the second pair of side permanent magnets being set to be N. pole, and two wing permanent magnets extending in the longitudinal direction of the vehicle and provided on two sides of a bottom of the levitation power chambers, respectively.

According to an embodiment, there is provided a magnetic levitation guideway, comprising: a grooved guideway defining a groove therein; first and second pairs of ferromagnetic balance levitation tracks extending in a longitudinal direction of the grooved guideway, the first pair of ferromagnetic balance levitation tracks being disposed parallel to each other with a predetermined interval therebetween and arranged on a first side of two sides of the groove of the grooved guideway, and the second pair of ferromagnetic balance levitation tracks being disposed parallel to each other with the predetermined interval therebetween and arranged on a second side of the two sides of the groove of the grooved guideway; and two permanent magnet tracks disposed on two sides of a bottom of the groove of the grooved guideway, respectively.

In the magnetic levitation guideway-train system according to the present application, the levitation power chambers located at a lower portion of the train are fitted in the grooved guideway, and the side permanent magnets of the levitation power chambers and the ferromagnetic balance levitation tracks correspond to one another so as to generate upward or downward balance attractive force for the train. That is, the train can be levitated and constrained from going off the guideway from above. In addition, the wing permanent magnets at the bottom of the levitation power chamber and the permanent magnet tracks correspond to one another so that the identical poles of the wing permanent magnets and the permanent magnet tracks repel one another to provide the train with an upward repulsion levitation force. Furthermore, the train is regulated at the center of the two guide traces by contacting of the guide wheels and the corresponding guide tracks composed of the linear stators. Moreover, the rotator wheels of magnetic motors and the guide wheels are arranged at the predetermined interval in the longitudinal direction of the train. The rotator wheels of magnetic motors are rotated by the electric motors so that a pulling force is generated between the rotator wheels of magnetic motors and the guide tracks so as to drive and brake the train. The magnetic levitation bogies perform a secondary damping for bump of the train to assure that the train is comfortable when running.

The levitation guideway-train system of the present invention has the following advantages.

1. It is convenient to maintain and examine the magnetic levitation guideway with high efficiency, and the system is constructed at a low cost.

2. Noise is emitted upwards, so as to less adversely affect the ground, which is environment friendly.

3. Land is saved due to the elevated guideway.

4. The guideway is avoided from deformation due to frost thawing.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A magnetic levitation guideway-train system, comprising:
   a vehicle including a vehicle body;
   a grooved guideway defining a groove therein;
   first and second pairs of ferromagnetic balance levitation tracks extending in a longitudinal direction of the grooved guideway, the first pair of ferromagnetic balance levitation tracks being disposed parallel to each other with a predetermined interval therebetween and arranged on a first side of two sides of the groove of the grooved guideway, and the second pair of ferromagnetic balance levitation tracks being disposed parallel to each other with the predetermined interval therebetween and arranged on a second side of the two sides of the groove of the grooved guideway;

first and second pairs of side permanent magnets extending in a longitudinal direction of the vehicle body, the first pair of side permanent magnets being disposed, corresponding to the first pair of ferromagnetic balance levitation tracks, on a first side of two sides of the vehicle body and one of the first pair of side permanent magnets being set to be S pole and the other one of the first pair of side permanent magnets being set to be N pole, and the second pair of side permanent magnets being disposed, corresponding to the second pair of ferromagnetic balance levitation tracks, on a second side of the two sides of the vehicle body and one of the second pair of side permanent magnets being set to be S pole and other one of the second pair of side permanent magnets being set to be N pole;

first and second guide tracks extending in the longitudinal direction of the grooved guideway and disposed on the two sides of the groove of the grooved guideway, respectively, each of the first and second guide tracks is formed by arranging ferromagnetic stator shoes at an equal interval in the longitudinal direction of the grooved guideway;

a first plurality of rotator wheels of magnetic motors disposed between the first pairs of side permanent magnets and arranged on the first side of the two sides of the vehicle body at a predetermined interval in the longitudinal direction of the vehicle body; and a second plurality of rotator wheels of magnetic motors disposed between the second pairs of side permanent magnets and arranged on the second side of the two sides of the vehicle body at the predetermined interval in the longitudinal direction of the vehicle body;

wherein the first and second rotator wheels of magnetic motors interact with the corresponding guide tracks so as to generate a tractive force for driving the vehicle.

2. The magnetic levitation guideway-train system according to claim 1, further comprising:

two wing permanent magnets extending in the longitudinal direction of the vehicle body and provided on two sides of a bottom of the vehicle body, respectively; and two permanent magnet tracks extending in the longitudinal direction of the grooved guideway and disposed, corresponding to the respective wing permanent magnets, on two sides of a bottom of the groove of the grooved guideway, respectively, identical poles of the wing permanent magnets and the corresponding permanent magnet tracks face each other, so as to provide the vehicle with an upward levitation force.

3. The magnetic levitation guideway-train system according to claim 2, wherein there is an air gap of 3-60 mm between the wing permanent magnets and the permanent magnet tracks.

4. The magnetic levitation gnideway-train system according to claim 2, wherein the vehicle comprises levitation power chambers, and cars located above the power chambers, the wing permanent magnets are disposed at the levitation power chambers.

5. The magnetic levitation guideway-train system according to claim 1, further comprising:

a layer of aluminium alloy coated on a surface of each of the ferromagnetic stator shoes.

6. The magnetic levitation guideway-train system according to claim 1, further comprising:

a plurality of guide wheels provided on the vehicle body at a predetermined interval in the longitudinal direction of the vehicle body and engaging the corresponding guide tracks so as to keep the vehicle at a center between the guide tracks.

7. The magnetic levitation guideway-train system according to claim 1, wherein:

there is an air gap of 3-40 mm between the ferromagnetic balance levitation tracks and the corresponding side permanent magnets.

8. The magnetic levitation gnideway-train system according to claim 1, wherein:

there is an air gap of 3-50 mm between the rotator wheels of magnetic motors and the guide tracks.

9. The magnetic levitation guideway-train system according to claim 1, wherein the vehicle comprises levitation power chambers, and cars located above the power chambers, the side permanent magnets are disposed at the levitation power chambers.

10. The magnetic levitation guideway-train system according to claim 1, wherein the vehicle comprises levitation power chambers, and cars located above the power chambers, the rotator wheels of magnetic motors are disposed at the levitation power chambers.

11. A magnetic levitation gnideway-train system, comprising:

a vehicle including levitation power chambers and cars located above the power chambers;

a grooved guideway defining a groove therein;

first and second pairs of ferromagnetic balance levitation tracks extending in a longitudinal direction of the grooved guideway, the first pair of ferromagnetic balance levitation tracks being disposed parallel to each other with a predetermined interval therebetween and arranged on a first side of two sides of the groove of the grooved guideway, and the second pair of ferromagnetic balance levitation tracks being disposed parallel to each other with the predetermined interval therebetween and arranged on a second side of the two sides of the groove of the grooved guideway;

first and second pairs of side permanent magnets extending in a longitudinal direction of the vehicle, the first pair of side permanent magnets being disposed, corresponding to the first pair of ferromagnetic balance levitation tracks, on a first side of two sides of the levitation power chambers and one of the first pair of side permanent magnets being set to be S pole and other one of the first pair of side permanent magnets being set to be N pole, and the second pair of side permanent magnets being disposed, corresponding to the second pair of ferromagnetic balance levitation tracks, on a second side of the two sides of the levitation power chambers and one of the second pair of side permanent magnets being set to be S pole and other one of the second pair of side permanent magnets being set to be N pole, two wing permanent magnets extending in the longitudinal direction of the vehicle body and provided on two sides of a bottom of the levitation power chambers, respectively; and two permanent magnet tracks extending in the longitudinal direction of the grooved guideway and disposed, corresponding to the respective wing permanent magnets, on two sides of a bottom of the groove of the grooved guideway, respectively, identical poles of the wing permanent magnets and the corresponding permanent magnet tracks face each other, so as to provide the vehicle with an upward levitation force;

first and second guide tracks extending in the longitudinal direction of the grooved guideway and disposed on the two sides of the groove of the grooved guideway, respectively, each of the first and second guide tracks is formed by arranging ferromagnetic stator shoes at an equal interval in the longitudinal direction of the grooved guideway;

a first plurality of rotator wheels of magnetic motors disposed between the first pairs of side permanent magnets and arranged on the first side of the two sides of the vehicle body at a predetermined interval in the longitudinal direction of the vehicle body; and a second plurality of rotator wheels of magnetic motors disposed between the second pairs of side permanent magnets and arranged on the second side of the two sides of the vehicle body at the predetermined interval in the longitudinal direction of the vehicle body;

wherein the first and second rotator wheels of magnetic motors interact with the corresponding guide tracks so as to generate a tractive force for driving the vehicle.

12. A magnetic levitation guideway-train system comprising:

a grooved guideway fixed on piers;

first and second guide tracks each formed by arranging ferromagnetic stator shoes at an equal interval, and fixed on two inner sides of the grooved guideway, respectively;

a first pair of ferromagnetic balance levitation tracks fixed parallel to each other on upper and lower portions of the first guide track, respectively;

a second pair of ferromagnetic balance levitation tracks fixed parallel to each other on upper and lower portions of the second guide track, respectively;

two permanent magnet tracks disposed on two sides of a bottom inside the grooved guideway, respectively;

a vehicle including levitation power chambers and cars, the levitation power chambers being located within the grooved guideway, an operating air gas of 30-200 mm being formed between an outer bottom surface of the levitation power chambers and the grooved guideway;

upper and lower side permanent magnets fixed, corresponding to the perspective first and second pairs of ferromagnetic balance levitation tracks on the first and second guide tracks, on each of two sides of a levitation power chamber body of each of the levitation power chambers, an operating air gap of 3-40 mm being formed between the ferromagnetic balance levitation tracks and the corresponding side permanent magnets, one of the upper and lower side permanent magnets on each of the two sides of the levitation power chamber body being set to be S pole, and the other one of the upper and lower side permanent magnets on each of the two sides of the levitation power chamber body being set to be N pole, so that: when the side permanent magnets and the corresponding ferromagnetic balance levitation tracks have the same level, an attractive force in a vertical direction between the side permanent magnets and the corresponding ferromagnetic balance levitation tracks is 0; when the side permanent magnets are lower than the corresponding ferromagnetic balance levitation tracks, an upward levitation force is generated between them; and when the side permanent magnets are higher than the corresponding ferromagnetic balance levitation tracks, a downward pulling force is generated between them;

rotator wheels of magnetic motors disposed between the upper and lower side permanent magnets on each side of the two sides of the levitation power chambers and arranged horizontally at a predetermined interval in a longitudinal direction of the vehicle, an air gap of 3-50 mm being kept between the rotator wheels and the corresponding guide tracks so as to generate a tractive force or a braking force therebetween;

guide wheels disposed between the upper and lower side permanent magnets on each side of the two sides of the levitation power chambers and arranged horizontally at a predetermined interval in a longitudinal direction of the vehicle, wherein the guide wheels control the vehicle so that the vehicle is regulated at a center between the two guide tracks on the grooved guideways; two wing permanent magnet provided on two sides of a outer bottom of each of the levitation power chambers, respectively, identical poles of the two wing permanent magnets and the two permanent magnet tracks, which are disposed on the two sides of the inner bottom of the grooved guideway, facing each other with an air gap of 3-60 mm therebetween, respectively, so as to generate a repulsion levitation force therebetween;

chassis for the cars to and under which each of the levitation power chambers is connected through a shaft, each car having at least two levitation power chambers connected under the car;

circular upper permanent magnets disposed on a lower surface of the chassis of each of the cars, a circular lower permanent magnet disposed on a upper surface of each of the levitation power chambers, the upper permanent magnets and the corresponding lower permanent magnets being arranged coaxially, with identical poles of the upper permanent magnets and the corresponding lower permanent magnets facing each other, respectively, so that each of the cars is levitated above the levitation power chambers and the levitation power chambers are rotatable about the respective shafts with respect to the car.

13. The magnetic levitation guideway-train system according to claim 12, wherein the grooved guideway comprises at least two grooved guideways, and a temperature joint is disposed between adjacent grooved guideways of the at least two grooved guideways.

14. The magnetic levitation guideway-train system according to claim 12, further comprising:

upper shaft sleeves fixed to the chassis of each of the cars, and a lower shaft sleeve fixed to an upper portion of each of the levitation chambers, wherein the shafts are fitted in the upper and lower shaft sleeves.

15. The magnetic levitation guideway-train system according to claim 12, further comprising:

gear trains; and electric motors, wherein each of the rotator wheels of magnetic motors is connected to one of the electric motors via one of the gear trains.

* * * * *